(12) United States Patent
Elam (10) Patent No.: US 10,547,414 B2
(45) Date of Patent: Jan. 28, 2020

(54) METHOD AND APPARATUS FOR BROADCASTING WITH SPATIALLY DIVERSE SIGNALS

(71) Applicant: Greenwich Technologies Associates, Greenwich, CT (US)

(72) Inventor: Carl M. Elam, Perry Hall, MD (US)

(73) Assignee: Greenwich Technologies Associates, Greenwich, CT (US)

( * ) Notice: Subject to any disclaimer, the term of this patent is extended or adjusted under 35 U.S.C. 154(b) by 0 days.

(21) Appl. No.: 14/321,481

(22) Filed: Jul. 1, 2014

(65) Prior Publication Data

US 2015/0163018 A1 Jun. 11, 2015

Related U.S. Application Data

(63) Continuation of application No. 13/116,038, filed on May 26, 2011, now Pat. No. 8,767,842, which is a continuation of application No. 10/354,093, filed on Jan. 30, 2003, now Pat. No. 7,965,794, and a continuation-in-part of application No. 09/851,450, filed on May 7, 2001, now Pat. No. 6,608,588, and a continuation-in-part of application No. 09/697,187, filed on Oct. 27, 2000, now Pat. No. 6,823,021.

(60) Provisional application No. 60/352,266, filed on Jan. 30, 2002, provisional application No. 60/202,055, filed on May 5, 2000.

(51) Int. Cl.
*H04L 1/06* (2006.01)
*H04B 7/08* (2006.01)

(52) U.S. Cl.
CPC ............ *H04L 1/0631* (2013.01); *H04B 7/08* (2013.01)

(58) Field of Classification Search
CPC .............. H04L 27/2613; H04L 27/261; H04L 27/2602; H04L 27/2627; H04L 27/28; H04L 27/2647; H04L 1/1829; H04L 1/1867; H04W 48/10; H04J 13/16; H04J 13/18; H04B 7/0669
USPC ........ 375/134, 137, 141–143, 145, 149–150, 375/152, 260, 267, 299, 315, 316, 343, 375/364, 368; 455/65, 132, 500, 63.4, 455/279.1, 553.1
See application file for complete search history.

(56) References Cited

U.S. PATENT DOCUMENTS

| | | | |
|---|---|---|---|
| 3,680,100 A | 7/1972 | Woerrlein | |
| 4,028,699 A | 6/1977 | Stevens | |
| 4,045,796 A | 8/1977 | Kline, Jr. | |
| 4,122,397 A * | 10/1978 | Thomas | G11B 20/1492 327/291 |
| 4,130,811 A | 12/1978 | Katz et al. | |
| 4,330,876 A | 5/1982 | Johnson | |
| 4,965,732 A | 10/1990 | Roy, III et al. | |
| 5,260,968 A | 11/1993 | Gardner et al. | |
| 5,291,516 A * | 3/1994 | Dixon | H04B 1/005 375/131 |
| 5,515,378 A | 5/1996 | Roy, III et al. | |

(Continued)

*Primary Examiner* — Khanh C Tran
(74) *Attorney, Agent, or Firm* — Snyder, Clark, Lesch & Chung, LLP (57) ABSTRACT

A transmitter broadcasts a signal having a different code characteristic for each of several directions. A receiver receives the broadcast signal from one of the directions and generates an expected signal for that direction based on the code characteristic for that direction. The receiver detects the broadcast signal from the direction based on the expected signal for that direction.

20 Claims, 7 Drawing Sheets

(56) References Cited

U.S. PATENT DOCUMENTS

| | | | | |
|---|---|---|---|---|
| 5,566,209 | A | 10/1996 | Forssen et al. | |
| 5,619,503 | A | 4/1997 | Dent | |
| 5,649,287 | A * | 7/1997 | Forssen | H01Q 3/26 342/367 |
| 5,703,874 | A * | 12/1997 | Schilling | G01S 5/0036 370/335 |
| 5,722,083 | A | 2/1998 | Konig | |
| 5,732,075 | A | 3/1998 | Tangemann et al. | |
| 5,793,798 | A * | 8/1998 | Rudish | G01S 7/023 375/130 |
| 5,808,580 | A | 9/1998 | Andrews, Jr. | |
| 5,878,037 | A * | 3/1999 | Sherman | H04B 1/707 370/335 |
| 5,886,988 | A | 3/1999 | Yun et al. | |
| 5,909,649 | A | 6/1999 | Saunders | |
| 5,930,290 | A | 7/1999 | Zhou et al. | |
| 5,940,742 | A | 8/1999 | Dent | |
| 6,023,514 | A | 2/2000 | Strandberg | |
| 6,031,485 | A | 2/2000 | Cellai et al. | |
| 6,031,865 | A | 2/2000 | Kelton et al. | |
| 6,078,576 | A * | 6/2000 | Schilling | H04B 7/2618 370/335 |
| 6,097,714 | A | 8/2000 | Nagatani et al. | |
| 6,107,963 | A | 8/2000 | Ohmi et al. | |
| 6,128,330 | A * | 10/2000 | Schilling | H04B 1/7115 375/141 |
| 6,137,433 | A | 10/2000 | Zavorotny et al. | |
| 6,163,564 | A | 12/2000 | Rudish et al. | |
| 6,163,566 | A | 12/2000 | Shiino | |
| 6,240,122 | B1 | 5/2001 | Miyashita | |
| 6,275,679 | B1 | 8/2001 | Elam et al. | |
| 6,275,704 | B1 * | 8/2001 | Dixon | H04W 16/00 455/422.1 |
| 6,331,837 | B1 | 12/2001 | Shattil | |
| 6,356,528 | B1 * | 3/2002 | Lundby et al. | 370/209 |
| 6,362,780 | B1 | 3/2002 | Butz et al. | |
| 6,373,877 | B1 * | 4/2002 | Mesecher | 375/130 |
| 6,392,588 | B1 | 5/2002 | Levanon | |
| 6,510,173 | B1 * | 1/2003 | Garmonov | H04L 1/0071 375/141 |
| 6,577,615 | B1 * | 6/2003 | Ritter et al. | 370/342 |
| 6,580,701 | B1 | 6/2003 | Ylitalo et al. | |
| 6,608,588 | B2 | 8/2003 | Elam | |
| 6,643,526 | B1 | 11/2003 | Katz | |
| 6,771,698 | B1 | 8/2004 | Beck | |
| 6,804,216 | B1 * | 10/2004 | Kuwahara et al. | 370/335 |
| 6,829,360 | B1 * | 12/2004 | Iwata | G10L 21/038 381/61 |
| 2001/0047503 | A1 | 11/2001 | Zhang | |
| 2002/0021240 | A1 * | 2/2002 | Elam | G01S 13/003 342/189 |
| 2002/0025793 | A1 * | 2/2002 | Meijer | H04B 7/0814 455/277.1 |
| 2002/0094016 | A1 * | 7/2002 | Mesecher | 375/130 |
| 2002/0159506 | A1 * | 10/2002 | Alamouti et al. | 375/147 |
| 2006/0217091 | A1 * | 9/2006 | Tsukio | H01Q 1/241 455/130 |
| 2010/0246560 | A1 * | 9/2010 | Kim | 370/345 |

\* cited by examiner

METHOD AND APPARATUS FOR BROADCASTING WITH SPATIALLY DIVERSE SIGNALS

RELATED APPLICATIONS

This application is a continuation of U.S. patent application Ser. No. 13/116,038, filed May 26, 2011, which is a continuation of U.S. patent application Ser. No. 10/354,093, filed Jan. 30, 2003, which (1) claims the benefit of U.S. Provisional Application No. 60/352,266, filed Jan. 30, 2002; (2) is a continuation-in-part of U.S. patent application Ser. No. 09/851,450, filed May 7, 2001, which claims the benefit of U.S. Provisional Application No. 60/202,055, filed May 5, 2000; and (3) is a continuation-in-part of U.S. patent application Ser. No. 09/697,187, filed Oct. 27, 2000; all of which are incorporated herein by reference.

FIELD

Methods and systems consistent with this invention relate to broadcasting signals, and in particular broadcasting spatially diverse signals.

BACKGROUND

Broadcast systems, such as mobile telephone communication systems, often experience problems in "multipath environments." A multipath environment can occur when a broadcasted signal reflects or scatters off various objects such as buildings, water towers, airplanes, or cars. A receiver (such as a cell phone) may receive these reflected signals along with the direct or line-of-sight signal. The reflected signals and direct signal may each arrive at slightly different times at the receiver, causing confusion and errors.

This multipath problem is particularly significant in data communications where the difference in arrival times is long compared to the modulation rate of the signals. The multipath problem is also significant in mobile communications where the cell phone may receive many different or changing reflected signals as it moves

SUMMARY

Methods and systems consistent with this invention broadcast a signal having a different code characteristic for each of a plurality of directions; receive the broadcast signal from one of the plurality of directions and generate an expected signal for the one direction based on the different code characteristic for the one direction; and detect the broadcast signal from the one direction based on the expected signal for the one direction.

Both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION

Reference is now made in detail to exemplary embodiments of the invention illustrated in the accompanying drawings. Wherever possible, the same reference numbers are used throughout the drawings to refer to the same or like parts.

Figure 1:
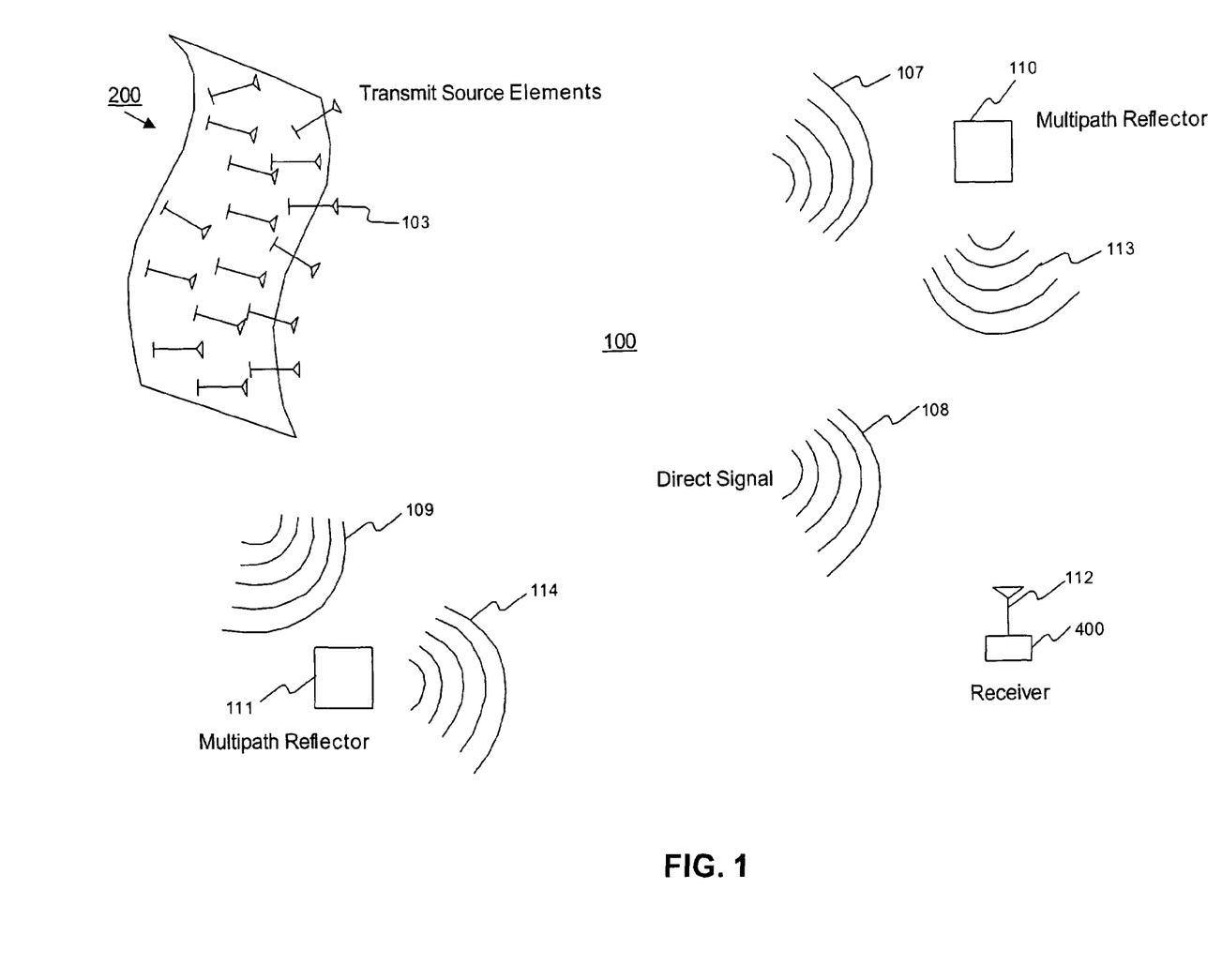
FIG. 1 is diagram of a multipath signal environment.

FIG. 1 is diagram of a multipath signal environment 100 with transmit source elements 103 that are part of a transmitter 200, a first multipath reflector 110, a second multipath reflector 111, and a receive sensor element 112. Transmit source elements 103 transmit a first transmitted signal 107, a second transmitted signal 109, and a direct transmitted signal 108, all of which may be transmitted at the same time. Thus, first transmit signal 107, second transmit signal 109, and direct transmit signal 109 may together be "a broadcast signal." First transmitted signal 107 reflects off first multipath reflector 110, forming a first reflected signal 113. Second transmitted signal 109 reflects off second multipath reflector 111, forming a second reflected signal 114.

Figure 2:
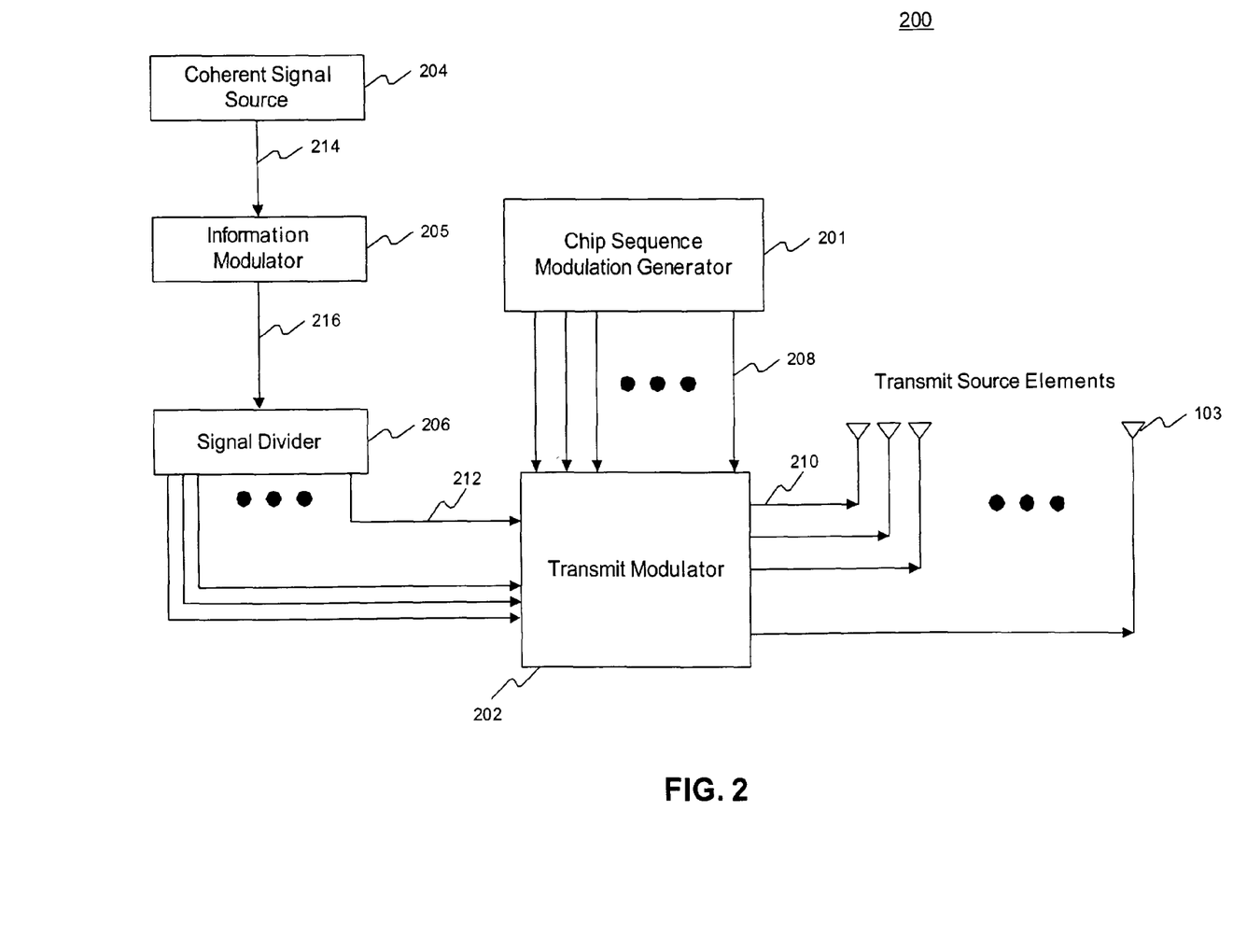
FIG. 2 is block diagram of a transmitter consistent with this invention.

FIG. 2 is block diagram of transmitter 200 consistent with this invention. Transmitter 200 may comprise a chip sequence modulation generator 201, a transmit modulator 202, transmit source elements 103, a coherent signal source 204, an information modulator 205, and a signal divider 206. Signal source 204 may provide a coherent reference carrier signal 214, for example, having a carrier frequency of $10^9$ Hz.

Information modulator 205 receives reference carrier signal 214 and may modulate reference carrier signal according to data or other information. For example, information modulator 205 may modulate by phase, frequency, or amplitude modulation. Information modulator 205 produces a modulated data carrier signal 216.

Signal divider 206 receives modulated data carrier signal 216 and produces a plurality of modulated data carrier signals 212, which may be of equal magnitude. Modulated data carrier signals 212 may also be generated independently and from signal sources that are less than coherent.

Chip sequence modulation generator 201 generates multiple chip sequence signals 208, and may generate one chip sequence for each of modulated data carrier signals 212. Each of chip sequence signals 208 may be statistically independent, random, or pseudo random. For example, chip sequence signals 208 may have a repeating sequence of 5,000 chips. The chips in chip sequence signals 208 may also each have a 20 nanosecond duration, although other chip duration values may be used.

Transmit modulator 202 receives data carrier signals 212 and chip sequence signals 208 and modulates data carrier signals 212 according to chip sequence signals 208. The modulation may be by phase, amplitude, or any other acceptable modulation technique. Each of the data carrier signals 212 may be independently modulated by one of chip sequence signals 208.

Transmit modulator 202 produces chip modulated signals 210 to the transmit source elements 103. Transmit source elements 103 radiate chip modulated signals 210 as a broadcast signal. In FIG. 1, the broadcast signal comprises transmit signals 107, 108, and 109.

Transmit source elements 103 may have many different arrangements, such as a linear, circular, planar, spherical, or conformal array. Transmit source elements 103 may also be various types of radiating elements, for example with an isotropic radiation pattern or a radiation pattern that is sectoral and overlaps to form an aperture. Each of transmit source elements 103 may be separated from each other by approximately ½ wavelength, although much greater separation is also possible.

Figure 3:
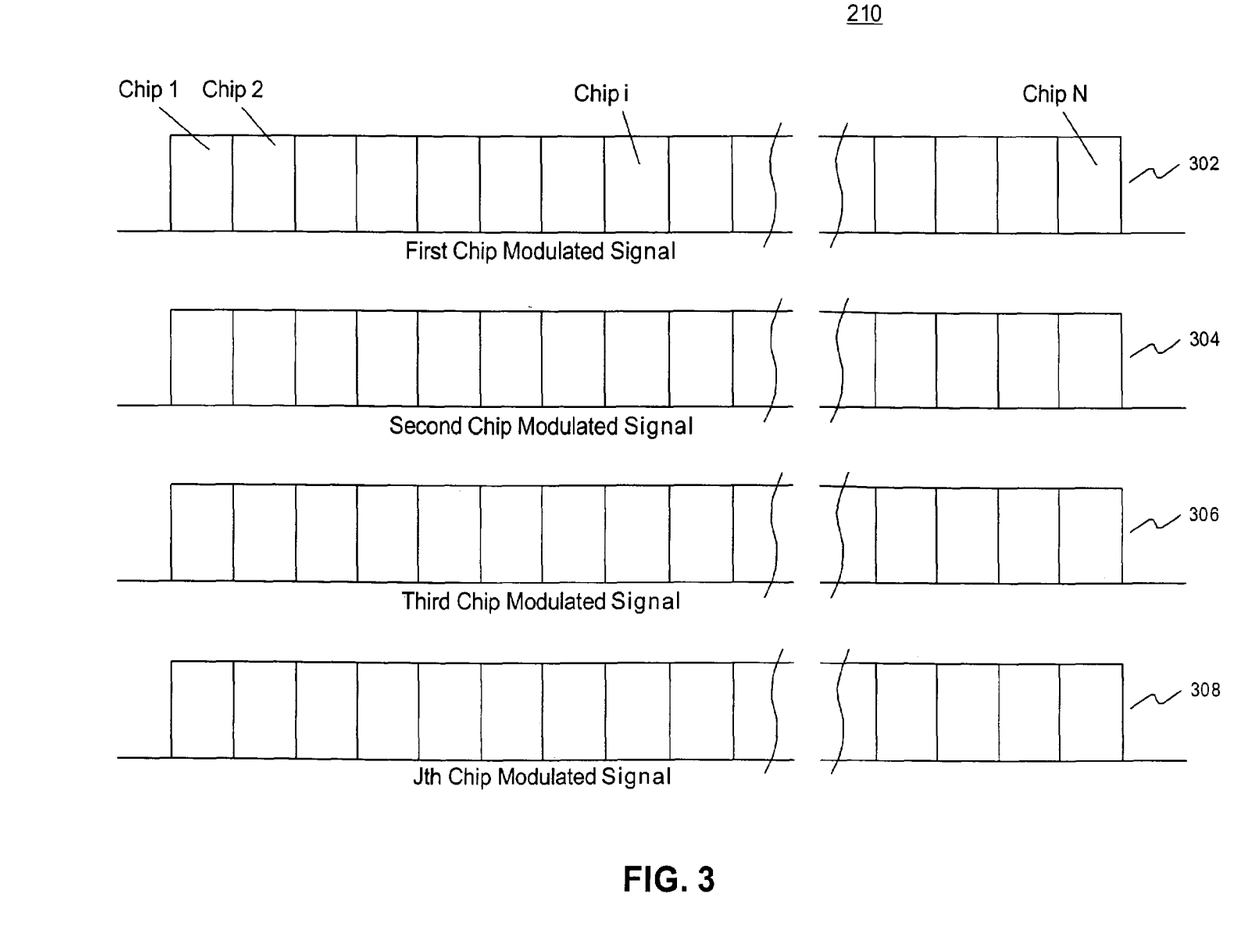
FIG. 3 is signal diagram of chip modulated signals consistent with this invention.

FIG. 3 is signal diagram of chip modulated signals 210 consistent with this invention including a first chip modulated signal 302, a second chip modulated signal 304, a third chip modulated signal 306, and a Jth chip modulated signal 308, each with N chips. J is the number of source elements 103 and N is the number of consecutive chips processed together by a correlator within a receiver, as described below. Each chip may have the same vector magnitude but a random vector angle, or phase. Also, transmitter 200 may broadcast continuous chip modulated signals 210 that may be random or repeated sequences.

Radiated chip modulated signals 210 may combine in space, and the resultant transmitted signals 107, 108, and 109 may differ from each other from chip-to-chip, and may conform to a Rayleigh density function. Therefore, each chip at different points in space surrounding transmit source elements 103 may have different phases and the magnitude may tend to equal the mean value of a Rayleigh density function.

Thus, as a result of modulation performed by transmit modulator 202 in FIG. 2, the chip sequence of first transmitted signal 107, may be different from both the chip sequence of direct transmitted signal 108 and second transmitted signal 109. For example, the chip sequence radiated into each direction of space may be statistically independent and uncorrelated with those radiated in other directions.

When the chip sequence of transmitted signal 107 is different from that of transmitted signal 108, they may be considered in different "code" beams that have different "code characteristics." Thus, each of transmitted signals 107, 108, and 109, radiated in different directions, may be in different code beams each with a different code characteristic. The different code characteristic may be different amplitude or phase characteristics.

Thus, methods and systems consistent with this invention may broadcast a signal with a different code characteristic for each direction. This broadcast signal may be considered "spatially diverse," and may be considered a type of spread spectrum signal.

The aperture of transmit source elements 103 may be used to determine the beamwidth of transmitted signals 107, 108, and 109 illustrated in FIG. 1. Here, beamwidth may refer to code beamwidth.

Figure 4:
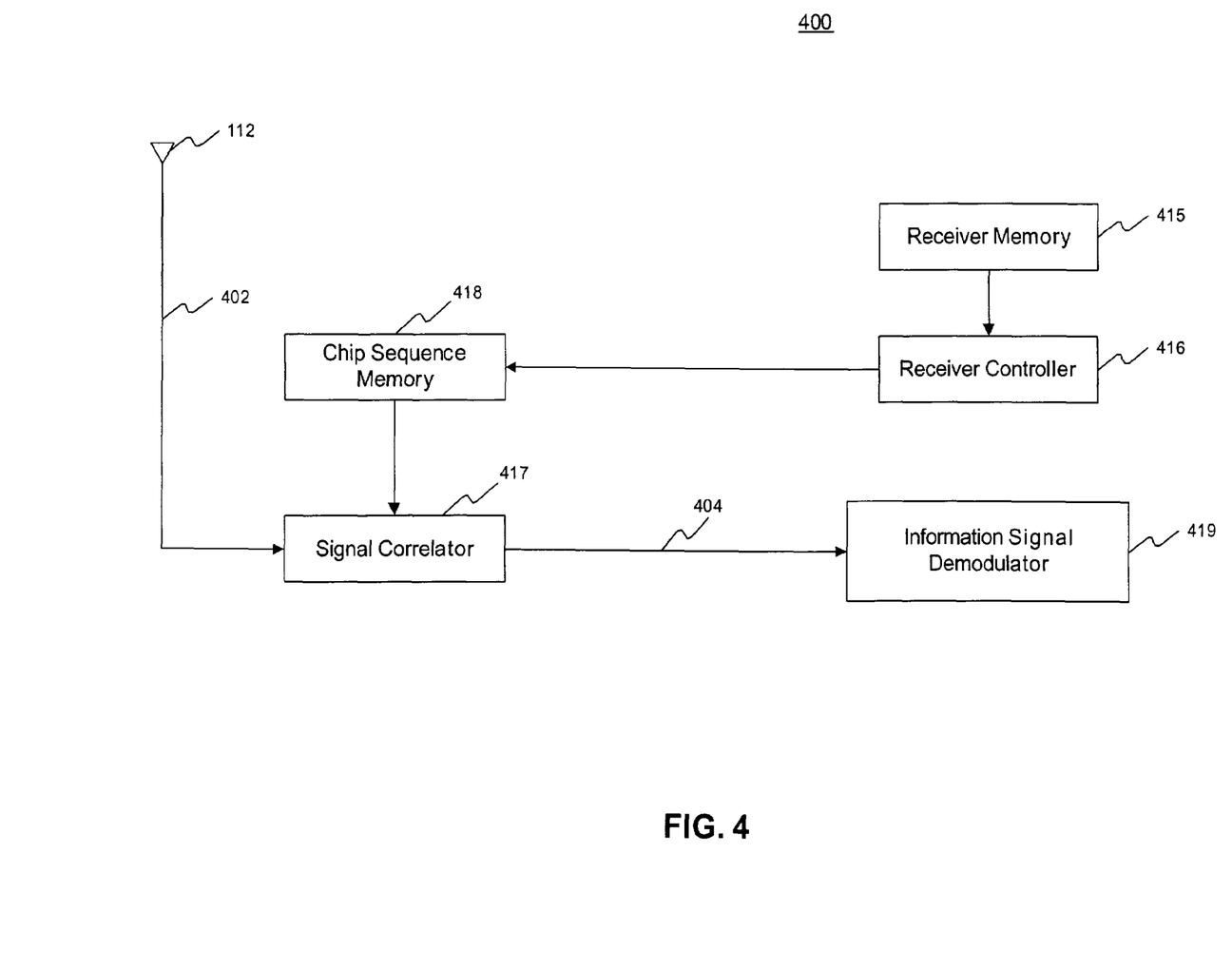
FIG. 4 is block diagram of a receiver consistent with this invention.

FIG. 4 is block diagram of a receiver 400 consistent with this invention. Receiver 400 comprises receive sensor element 112, a receiver memory 415, a receiver controller 416, a signal correlator 417, a chip sequence memory 418, and an information signal demodulator 419. Receive sensor element 112 may receive first reflected signal 113, direct transmitted signal 108, and second reflected signal 114 and send received signal 402 to signal correlator 417.

Receiver controller 416 may compute any or all the expected chip sequences (i.e., code characteristics) of any transmitted signal radiated in any direction (i.e., any code beam) from transmitter 200 as illustrated in FIG. 1. The "expected chip sequences" may be referred to as the "expected signal." For example, receiver controller may compute the expected signals for first transmit signal 107, second transmit signal 109, and direct transmit signal 108. To perform these computations, controller 416 may receive data from receiver memory 415. Receiver memory 415 may store data to compute expected signals, which may include data representing chip sequence signals 208 used in transmitter 200 and the position of transmit source elements 103. Thus, methods and systems consistent with this invention generate an expected signal for a direction based on a code characteristic for the direction. Receiver controller 416 may then output any expected signal to chip sequence memory 418 for storage. The expected signal is sent from chip sequence memory 418 and to signal correlator 417.

Signal correlator 417 may produce a detected signal output 404 that is a measure of the cross-correlation between the received signal and the expected signal. Correlator 417 may use any technique for signal comparison or detection that yields satisfactory detection performance. Signal correlator 417 sends detected signal 404 to information signal demodulator 419.

Receiver 400 may receive direct transmitted signal 108 along with first reflected signal 113 and second reflected signal 114. If receiver 400 chooses to detect direct transmitted signal 108, correlator 417 may receive from chiip sequence memory 418 the expected signal from the direction for direct signal 108 and detect direct signal 108. Methods and systems consistent with this invention detect a broadcast signal from a direction based on an expected signal.

Receiver 400 may also choose to detect reflected signals 114 or 113. First reflected signal 113 has the same code characteristic as first transmitted signal 107 and second reflected signal 114 has the same code characteristic as second transmitted signal 109. Receiver 400 may also choose to detect all three signals 108, 113, and 114 using three expected signals. In this case, receiver 400 may add the three detected signals to form a combined signal (after possibly time shifting some of the detected signals), and may use multiple signal correlators for detecting each of signals 108, 113 and 114.

Receiver memory 415 may also contain the expected signals for different directions (different code beams) emitted from transmitter 200. In this case, receiver controller 416 may not have to compute the expected signals, but may pass them to chip sequence memory 418.

Signal correlator 417 may perform a cross correlation between the received signal 402 and the expected signal. The cross correlation may include groups of N chips. A typical value of N is fifty, but other values may be used. The value of N may depend upon the chip rate and the highest information modulation rate.

Receiver 400 may comprise more than one receive element. Receiver 400 can also use signal processors described in U.S. patent application Ser. No. 09/851,450, filed May 7, 2001, and U.S. patent application Ser. No. 09/697,187, filed Oct. 27, 2000.

Figure 5:
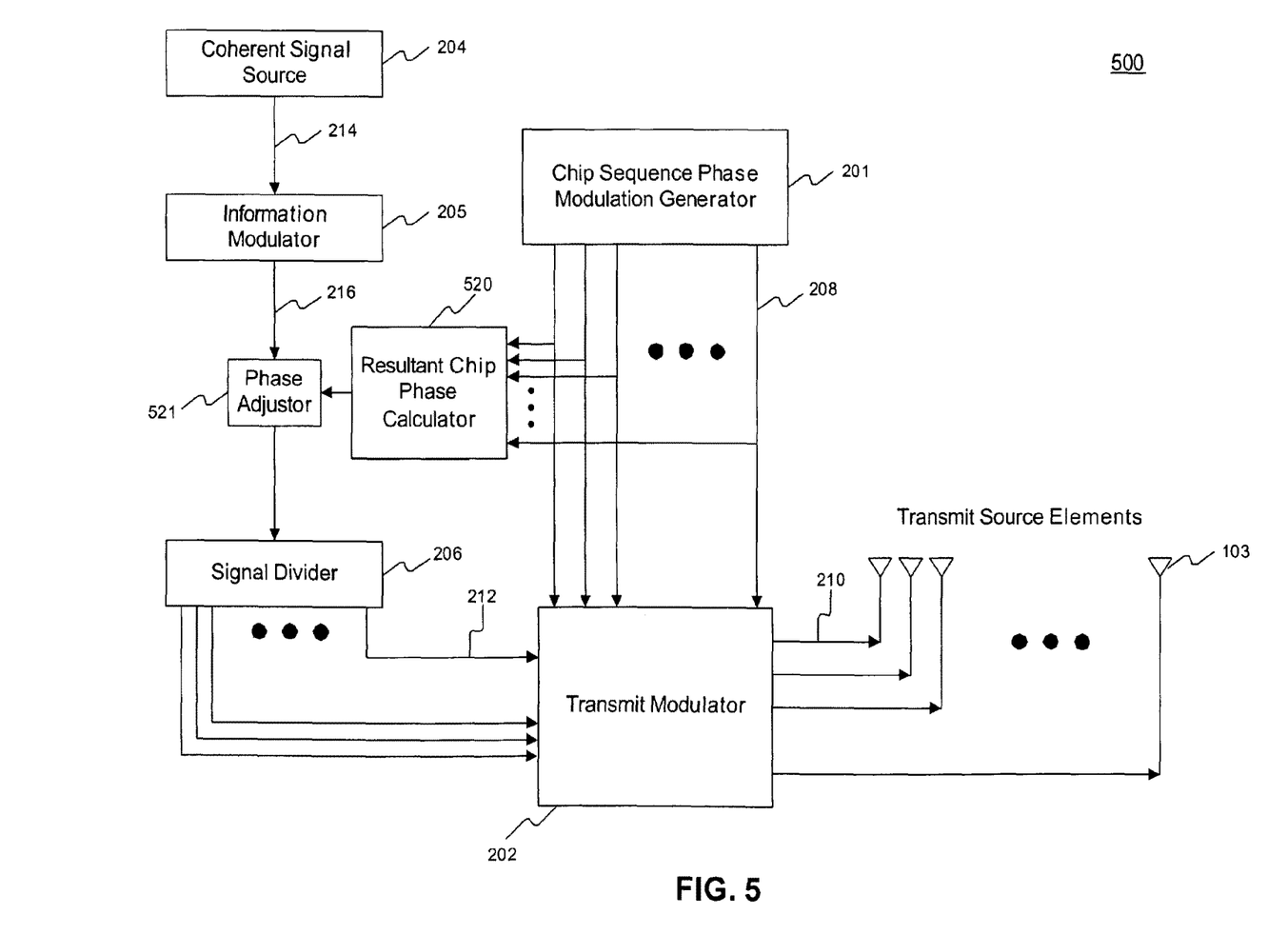
FIG. 5 is a block diagram of another transmitter consistent with this invention.

FIG. 5 is a block diagram of a transmitter 500 consistent with this invention. Transmitter 500 is similar to transmitter 200 in FIG. 2 but also may comprise a resultant chip phase calculator 520 and a phase adjustor 521. Phase adjustor 521 may alter the phase of data carrier signal 216 to remove chip-to-chip phase-shift variations within direct transmitted signal 108 as seen by receive element 112. Phase adjustor 521, however, may avoid altering any phase modulations imposed by the information modulator 205, as seen by receive element 112. To do this, phase shift adjustor 521 may receive information from resultant phase chip calculator 520. Resultant chip phase calculator 520 may store information (such as carrier frequency, transmission line lengths, geometry of transmit source elements 103, and direction of the intended receiver) to calculate the expected signal in the direction of an intended receiver, such as receiver 400. Chip sequence modulation generator 201 may be restricted to producing random phase modulated chips.

Figure 6:
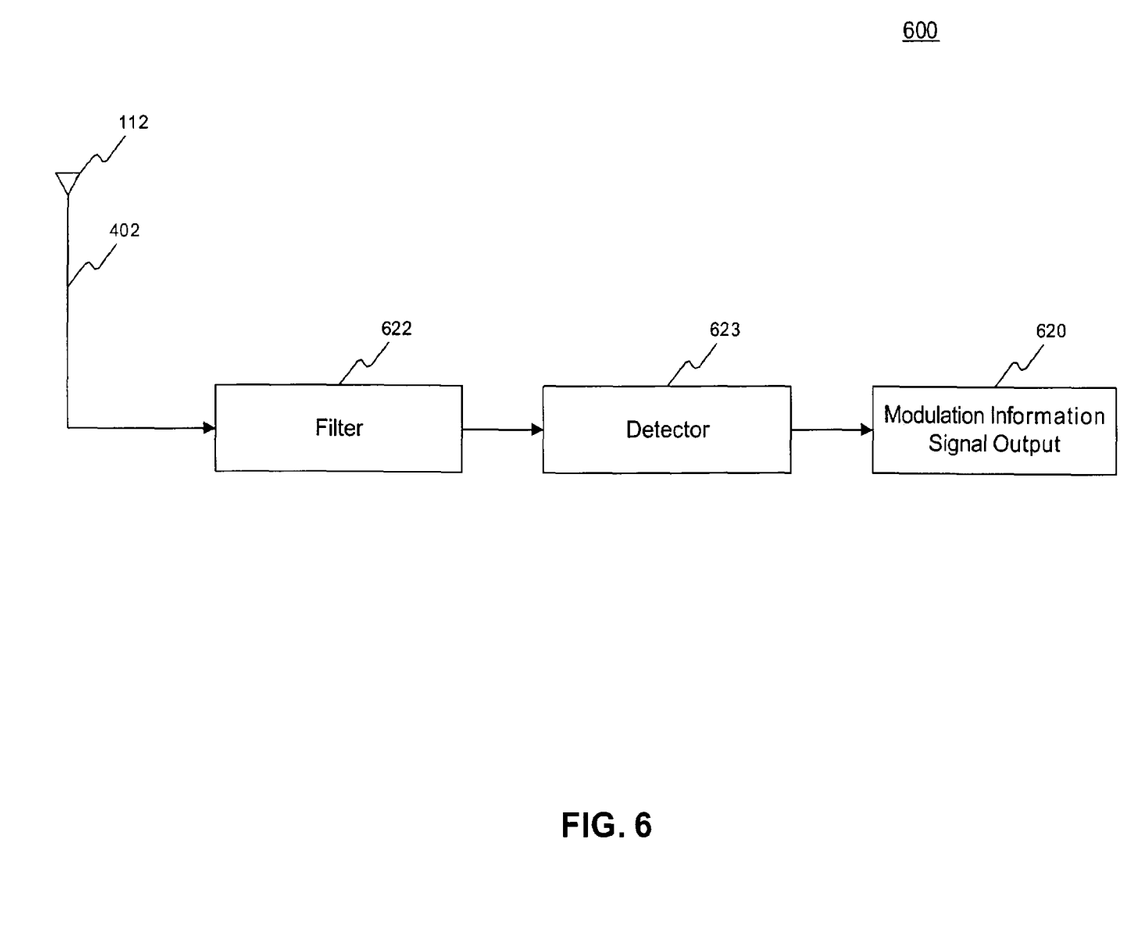
FIG. 6 is a block diagram of another receiver consistent with this invention.

FIG. 6 is a block diagram of a receiver 600 consistent with this invention. Receiver 600 may be similar to receiver 400 of FIG. 4, but may also include a filter 622 and a detector 623 and may be used with transmitter 500. Since the mean amplitude of the chips in direct transmitted signal 108 may tend to the mean of the Rayleigh density function, and since the chip rate may be significantly greater than the information modulation rate, receiver 400 may detect direct transmitted signal 108 with filter 622 and detector 623 and may operate without correlator 417. Receiver 600 may detect direct signal 108 because the chip-to-chip phase-shifts of the chips within direct signal 108 would have been removed by transmitter 500.

In FIG. 6, receive sensor element 112 receives direct transmitted signal 108 and reflected signals 113 and 114. Receive sensor element 112 sends received signal 402 to filter 622. Filter 622 may remove the random amplitude or phase variations of the chips, these variations being at frequencies greater than the information modulation rate. Filter 622 may be a low-pass filter if received signal 402 is a baseband signal. Filter 622 may be a bandpass filter if received signal 402 is conveyed upon a sinusoidal carrier. Filter 622 sends a filtered signal to detector 623, which detects the information modulated by information modulator 205. Finally, detector 623 sends the detected information to modulation information signal output 620.

Figure 7:
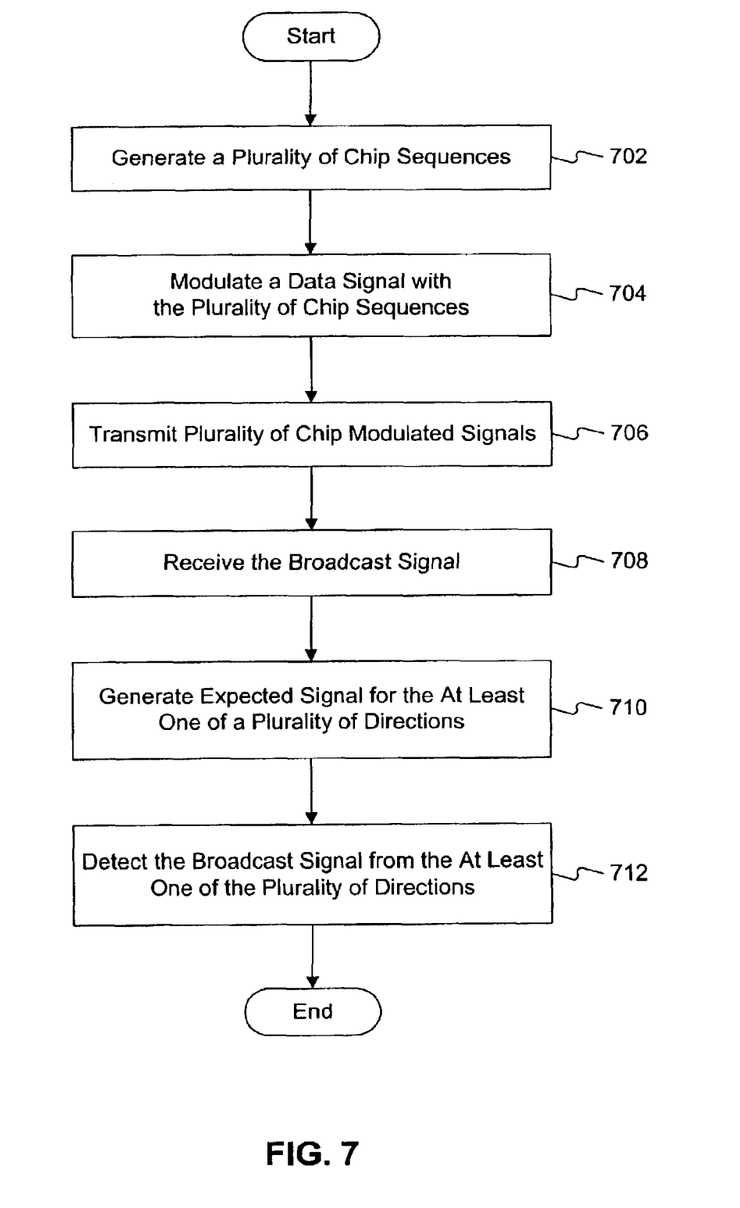
FIG. 7 is a flow chart of a method for broadcasting and receiving signals consistent with this invention.

FIG. 7 is a flow chart of a method for broadcasting and receiving signals consistent with this invention. The method generates a plurality of chip sequences (step 702), and modulates a data carrier signal with the plurality of chip sequences to generate a plurality of chip modulated signals (step 704). The method then transmits the plurality of chip modulated signals, thus broadcasting a signal, wherein the broadcast signal has a different code characteristic for each of a plurality of directions (step 706).

Next, the method receives the broadcast signal from one of the plurality of directions (step 708), and generates an expected signal the direction based on the different code characteristic for the direction (step 710). The method detects the broadcast signal from the direction based on the expected signal for the direction (step 712). Detecting the broadcast signal may include correlating the received broadcast signal with the expected signal.

The method may also receive the broadcast signal from the plurality of directions and generate an expected signal for the plurality of directions based on the code characteristics for the plurality of directions. The method may then detect the broadcast signal from the plurality of directions based on the plurality of expected signals.

In one embodiment, transmit modulator 202 may modulate data carrier signals 212 continuously at a rate that may be one hundred times the highest modulation frequency of the broadcast signal. In the correlation processing, the expected chip sequences from different beam directions may be given the index "K".

Signal correlator 417 may have a processing gain of $\sqrt{N}/1$ where "N" is the number of chips, within a resultant signal block of duration T, processed together, at the same time, by the signal correlator 417. The cross-correlation described may be between the resultant signal and a plurality of K expected signals.

The value for processing gain may be established as follows. A received signal block, which may also be referred to below as the resultant signal, containing N chips may have a correlation energy expression of:

$$R_{EK}(K,\emptyset) = \int_{t1}^{t1+T} \{\vec{v}_{EK}(t)\} \cdot \{\vec{v}_R(t)e^{+j\emptyset}\} dt$$

Where $\vec{v}_R(t)$ is the resultant signal comprised of N chips and $\vec{v}_{EK}(t)$ is the corresponding Kth expected signal also comprised of N chips. Each chip of both $\vec{v}_R(t)$ and $\vec{v}_{EK}(t)$ may have a mean square value expressed as $\alpha_R^2$ and $\alpha_{EK}^2$ respectively, or an r.m.s. value of $\alpha_R$ and $\alpha_{EK}$ respectively, and may be random vectors that conform with Rayleigh density functions with random phase and expected magnitude values of $$\frac{\sqrt{\pi}}{2}\alpha_R \text{ and } \frac{\sqrt{\pi}}{2}\alpha_{EK}$$

respectively. Each chip of $\vec{v}_R(t)$ can be considered as a random vector that is composed of random phase chips from transmit source elements 103.

The phase shift term $e^{+j\emptyset}$ may be applied equally to all chips of a resultant signal block where the parameter Ø may be chosen to maximize the correlation output for each processed resultant signal block. In applications where the received signal is phase modulated by information modulator 105, as with QPSK, the parameter Ø may be used to derive the carrier phase information.

The magnitude of the correlation energy of N chips, which are well correlated, may be expressed as $$N a_R a_{EK}\left(\frac{T}{N}\right),$$

where T is the resultant signal block duration and where $$\left(\frac{T}{N}\right)$$

is the time interval of a single chip.

If the resultant signal block of chips are random with respect to the corresponding expected signal block of chips, the magnitude of the correlation energy of the N chips may be expressed as $$\sqrt{N} a_R a_{EK}\left(\frac{T}{N}\right).$$

In this case, the N resultant signal vectors, represented by N received chips, may have random phases with respect to their corresponding N expected signal vectors represented by corresponding N chips. The sum of N random vectors (with r.m.s. value of $\alpha_R$) may be considered to be two dimensional Gaussian (with r.m.s. value of $\sqrt{N}\alpha_R$).

The value for processing gain may be found by forming the ratio of the correlator output for a well correlated signal $$N\alpha_R \alpha_{EK}\left(\frac{T}{N}\right)$$

and an uncorrelated signal $$\sqrt{N}\, a_R a_{EK}\left(\frac{T}{N}\right).$$

This discussion has described processing the N received chips as a block. Whenever a new block of chips is intercepted by the receiver, receiver controller 416. may form a corresponding new expected block of chips.

Other embodiments of the invention are apparent to those skilled in the art from consideration of the specification and practice of the invention disclosed herein. For example, this invention may apply to acoustic signals as well as electromagnetic signals. The word "signal" used herein may include both electromagnetic and acoustic signals. The word "transmitter" includes acoustic emitters and electromagnetic antennas.

In one embodiment for an underwater acoustic system, chip sequence signals 208 may be a sequence of chips having four millisecond duration. In this embodiment, the carrier frequency may be 5,000 Hz. Other values of frequency and chip duration may be used. Transmit source elements 103 may also be grouped into any irregular arrangement within a region of space or water.

It is generally easier for signal processors to generate pseudo-random numbers rather than purely random numbers, and thus the term "random" used in this application includes "pseudo-random." This pseudo-randomness applies to chip sequence signals 208 that may be either continuously variable or limited to a finite number of values. Finite pseudo-random codes may include Walsh, Barker, or Weltie functions. Finite pseudo-random codes may also include assigning to each chip a phase found by sampling (every 0.1 seconds for each sample) a series of harmonically related angles that are functions of time (e.g., (1t)radians, (2t)radians, (3t)radians, etc.). For example, the series of angles generated by the function (1t)radians, every 0.1 seconds, may modulate one of carrier signals 212; the series of angles generated by the function (2t)radians may modulate another one of carrier signals 212, etc. Also, modulation techniques, such as spread spectrum, may be used in combination with the teachings herein.

The specification and examples should be considered as exemplary only, with a true scope and spirit of the invention being indicated by the following claims.

What is claimed is:

1. A method for broadcasting and receiving data comprising:
    broadcasting a broadcast signal, where the broadcast signal propagates in a plurality of directions and includes a different code characteristic for each of the plurality of directions,
        wherein the broadcast signal is phase adjusted to remove characteristic code variations within direct transmitted signal to a receiver,
        wherein broadcasting the broadcast signal includes simultaneously transmitting a plurality of modulated signals, and
        wherein each code characteristic for the plurality of directions is a function of at least two of the plurality of modulated signals;
    receiving the direct transmitted broadcast signal;
    filtering the transmitted broadcast signal to remove signals with code characteristics from a plurality of directions; and
    detecting the direct broadcast signal.

2. The method of claim 1, wherein broadcasting the broadcast signal comprises:
    generating a plurality of chip sequence signals; and
    modulating a data carrier signal with the plurality of chip sequence signals in order to generate the plurality of modulated signals,
    wherein the broadcast signal results from the combination in space of the plurality of modulated signals,
    wherein the different code characteristics result from the combination in space of the plurality of modulated signals.

3. The method of claim 2, wherein generating a plurality of chip sequence signals includes generating chip sequence signals with random amplitude chips.

4. The method of claim 2, wherein generating the plurality of chip sequence signals comprises generating chip sequence signals with randomly phased chips.

5. The method of claim 4, wherein the different code characteristic comprises a different phase characteristic.

6. The method of claim 4, further comprising removing chip-to-chip phase shift variations based on the one of the plurality of directions.

7. The method of claim 4, wherein detecting the broadcast signal comprises detecting the data carrier signal.

8. The method of claim 1, wherein simultaneously transmitting the plurality of modulated signals includes simultaneously transmitting at least two of the plurality of modulated signals at a distance apart of approximately one-half a wavelength of the broadcast signal.

9. The method of claim 1, wherein the transmitted plurality of modulated signals combine in space resulting in the plurality of directions of the broadcast signal differing from each other chip-to-chip.

10. A method for receiving data comprising:
    receiving a broadcast signal, wherein the broadcast signal propagates in a plurality of directions and includes a different code characteristic for each of the plurality of directions,
        wherein the broadcast signal is phase adjusted to remove characteristic code variations within direct transmitted signal to a receiver,
        wherein a simultaneous transmission of a plurality of modulated signals that combine in space form the broadcast signal, and
        wherein the different code characteristics result from the combining in space of the plurality of transmitted modulated signals;
    receiving the direct transmitted broadcast signal;
    filtering the transmitted broadcast signal to remove signals with code characteristics from a plurality of directions; and
    detecting the direct broadcast signal.

11. The method of claim 10,
    wherein the plurality of modulated signals are generated by modulating a data carrier signal with a plurality of chip sequence signals in order to generate a plurality of modulated signals, and
    wherein simultaneously transmitting the plurality of modulated signals includes simultaneously transmitting at least two of the plurality of modulated signals at approximately one-half a wavelength of the broadcast signal apart.

12. The method of claim 11, wherein the plurality of chip sequence signals comprise chip sequence signals with random amplitude chips.

13. The method of claim 11, wherein the plurality of chip sequence signals comprise chip sequence signals with randomly phased chips.

14. The method of claim 13, further comprising removing chip-to-chip phase shift variations based on the one of the plurality of directions.

15. The method of claim 13, wherein detecting the broad cast signal comprises detecting the data carrier signal.

16. The method of claim 13, wherein the different code characteristic comprises a different phase characteristic.

17. The method of claim 16, wherein the broadcast signal comprises a plurality of code beans.

18. A system for broadcasting and receiving data comprising:
- a transmitter to broadcast a broadcast signal that propagates in a plurality of directions and includes a different code characteristic for each of the plurality of directions,
    - wherein the broadcast signal is phase adjusted to remove characteristic code variations within direct transmitted signal to a receiver, and
    - wherein the transmitter includes a plurality of transmit elements to transmit a plurality of modulated signals, and
    - wherein each code characteristic for the plurality of directions is a function of at least two of the plurality of modulated signals;
- a receiver to receive the direct transmitted broadcast signal;
- a receiver filter that filters the transmitted broadcast signal to remove signals with code characteristics from a plurality of directions; and
- a detector to detect the direct broadcast signal.

19. The system of claim 18, further comprising a chip sequence modulation generator to generate a plurality of chip sequence signals; and
- a transmit modulator to modulate a data carrier signal with the plurality of chip sequence signals in order to generate a plurality of modulated signals,
    - wherein each of the transmit elements simultaneously transmits a different one of the plurality of modulated signals;
    - wherein, as a result of the combination in space of the plurality of transmitted modulated signals, the broad cast signal is formed;
    - wherein, as a result of the combination in space of the plurality of transmitted modulated signals, each of the plurality of directions includes a different code characteristic.

20. The system of claim 19, wherein each of the plurality of chip sequence signals comprises randomly phased chips.

* * * * *